United States Patent
Westra et al.

(10) Patent No.: US 8,122,814 B2
(45) Date of Patent: Feb. 28, 2012

(54) BEVERAGE MAKER COMPRISING A FLOATING MEMBER FOR DETERMINING WHEN A WATER PUMPING ACTION NEEDS TO BE TERMINATED

(75) Inventors: Thewis M. Westra, Hoogeveen (NL); Peng Chau Quah, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 519 days.

(21) Appl. No.: 12/307,831

(22) PCT Filed: Jul. 11, 2007

(86) PCT No.: PCT/IB2007/052765
§ 371 (c)(1),
(2), (4) Date: Jan. 7, 2009

(87) PCT Pub. No.: WO2008/007343
PCT Pub. Date: Jan. 17, 2008

(65) Prior Publication Data
US 2009/0249962 A1    Oct. 8, 2009

(30) Foreign Application Priority Data
Jul. 11, 2006    (EP) .................................... 06116931

(51) Int. Cl.
*A47J 31/40* (2006.01)
*A47J 31/00* (2006.01)
(52) U.S. Cl. .......................................... 99/323; 99/282
(58) Field of Classification Search .................... 99/208, 99/281, 282, 283, 300, 302, 307
See application file for complete search history.

(56) References Cited

U.S. PATENT DOCUMENTS

| 3,297,844 | A |   | 1/1967  | Eisendrath |
|-----------|---|---|---------|------------|
| 3,422,745 | A | * | 1/1969  | Eisendrath ...................... 99/282 |
| 3,641,918 | A | * | 2/1972  | Schellgell et al. ............... 99/279 |
| 3,871,273 | A | * | 3/1975  | Hsieh ............................... 99/286 |
| 4,565,121 | A | * | 1/1986  | Ohya et al. ....................... 99/281 |
| 4,575,615 | A | * | 3/1986  | Shigenobu et al. ........... 392/450 |
| 6,000,317 | A |   | 12/1999 | Van Der Meer |
| 6,142,063 | A | * | 11/2000 | Beaulieu et al. ................ 99/283 |
| 6,889,600 | B2 |  | 5/2005  | Rava |
| 2006/0096465 | A1 | | 5/2006 | Hu et al. |

FOREIGN PATENT DOCUMENTS
EP    0672374 A1    9/1995
WO    2005094644 A1    10/2005

* cited by examiner

*Primary Examiner* — Nini Legesse
(74) *Attorney, Agent, or Firm* — Sherry Austin (57) ABSTRACT

A beverage maker (1) comprises a water tank (20) for containing and supplying water during a beverage making process, and a pump (40) for pumping the water out of the water tank (20). In order to terminate a pumping action at a predetermined point, the beverage maker (1) comprises a switch (64) which is arranged in a pumping circuit (41) for energizing the pump (40), a float (70) which is located in the water tank (20), and a coupling arm (71) attached to the float (70). During a pumping action, when a water level (21) in the water tank (20) is above a predetermined minimum level, the coupling arm (71) couples the float (70) to the switch (64), and the switch (64) is held in a closed position. However, as soon as the water level (21) reaches the minimum level, the coupling of the float (70) to the switch (64) is lost, and the switch (64) switches back to an opened position, as a result of which the pumping action is terminated.

10 Claims, 7 Drawing Sheets

BEVERAGE MAKER COMPRISING A FLOATING MEMBER FOR DETERMINING WHEN A WATER PUMPING ACTION NEEDS TO BE TERMINATED

FIELD OF THE INVENTION

The present invention relates to a device for dispensing a quantity of a liquid, comprising:
- a tank for containing the liquid;
- a pump for pumping the liquid out of the tank;
- an energizing circuit comprising a pumping circuit for energizing the pump; and
- a switching device which is arranged in the pumping circuit, and which is capable of either interrupting or closing the pumping circuit.

In particular, the present invention relates to a beverage maker which is suitable for supplying predetermined quantities of beverage.

BACKGROUND OF THE INVENTION

In general, a beverage maker is a device which is adapted to make a beverage, for example on the basis of a quantity of water and a quantity of beverage extract, wherein the water is conducted through the beverage extract. A beverage maker which is adapted to make a beverage on the basis of a quantity of water and a quantity of beverage concentrate, wherein the water and the beverage concentrate are mixed, is also well-known. A beverage maker may be equipped with means for heating the water in order to be capable of supplying hot beverages.

When a beverage maker is operated, a quantity of water that is needed for the purpose of performing a process of making a beverage is pumped out of the water tank of the beverage maker. Usually, this water tank is removably arranged, so that it is easy for a user of the beverage maker to take the water tank and fill it with water. The pumping action is performed by means of a pump, wherein an energizing circuit of the beverage maker comprises a pumping circuit for energizing the pump. When the pumping circuit is closed, the pump performs the pumping action, and when the pumping circuit is interrupted, the pumping action is terminated. For the purpose of closing or interrupting the pumping circuit, the beverage maker comprises at least one switching device.

In a process of making a beverage, a quantity of the water that is used in the process in relation to a quantity of extractable material or concentrate is an important factor. For example, in the case of a process of preparing coffee on the basis of a quantity of ground coffee beans and hot water, a proportion between the quantity of ground coffee beans and a quantity of hot water that is conducted through the ground coffee beans is determinative of the strength and aroma of the coffee. Therefore, it is important that the quantity of hot water that is that is conducted through the ground coffee beans is accurately controlled.

Methods for controlling the quantity of water that is used for the purpose of preparing a beverage on the basis of a predetermined quantity of extractable material or a predetermined quantity of concentrate are known. In many cases, a beverage maker is equipped with a controlling circuit which is adapted to operate the pump in such a way that a total period during which the pump is operated corresponds to a predetermined period which is representative of a predetermined quantity of water.

For example, U.S. Pat. No. 6,000,317 discloses a coffee maker having a water reservoir for containing cold water, a heating chamber for heating a quantity of water, and a pump for pumping water from the reservoir through the heating chamber to a filter device. During operation of the coffee maker, the actuation of the pump is controlled by a control device. In U.S. Pat. No. 6,000,317, it is noted that if the entire content of the reservoir is to be brewed, a sensor which is responsive to the absence of water may be applied, wherein a signal of this sensor leads to a termination of the operation of the pump. Furthermore, in U.S. Pat. No. 6,000,317, it is noted that in case it is desired to use the coffee maker for preparing coffee by using only a portion of water from the reservoir, the coffee maker may be provided with a control selector for inputting-to the control device the desired quantity of coffee to be brewed. In such case, a flow detector may be provided in a flow path between the reservoir and the filter device, to measure the total flow of water during the process of preparing the coffee. The control device will deactivate the pump when a desired flow has taken place. Alternatively, it is possible that the operating time of the pump is controlled depending upon a desired quantity of coffee to be brewed.

SUMMARY OF THE INVENTION

On the one hand, the above-described known methods of controlling a quantity of water that is used in a process of preparing coffee may yield good results, but, on the other hand, these methods require an application of rather expensive components in a beverage maker. It is an objective of the present invention to provide a device which is adapted to accurately control a quantity of water that is used in a process of making a beverage, and which does not need to be equipped with expensive components for doing so. The objective is achieved by a device for dispensing a quantity of a liquid, comprising:
- a tank for containing the liquid;
- a pump for pumping the liquid out of the tank;
- an energizing circuit comprising a pumping circuit for energizing the pump;
- a switching device which is arranged in the pumping circuit, which is capable of either interrupting or closing the pumping circuit, and which is biased to an opened position for interrupting the pumping circuit; and
- means which are adapted to act on the switching device in order to keep the switching device in a closed position when a level of the liquid in the tank is above a predetermined minimum level.

In the device according to the present invention, the switching device for either interrupting or closing the pumping circuit is biased to an opened position. For the purpose of putting the switching device to a closed position as long as there is liquid in the tank that is to be dispensed by the device, the device comprises means which are adapted to act on the switching device in order to keep the switching device in a closed position when a level of the liquid in the tank is above a predetermined minimum level. In a preferred embodiment, these means comprise a combination of a floating member and a coupling member which is attached to the floating member. The floating member is located in the tank, and is intended to be at least partially inserted in the liquid. The coupling member is capable of coupling the floating member to the switching device, provided that a level of the liquid in the tank, which determines a level at which the floating member is positioned in the tank, is above a predetermined minimum level.

During a pumping action, liquid is pumped out of the tank, and, as a consequence, the level of the liquid in the tank gets lower and lower. On the basis of this fact, the moment at which the pumping action is terminated may accurately be determined, as this moment may be the moment when the level of the liquid in the tank reaches the predetermined minimum level as a result of the loss of liquid.

As long as the level of the liquid in the tank is above the predetermined minimum level, the floating member is at a high enough level for being coupled to the switching device by means of the coupling member. In this situation, under the influence of the weight of the floating member, it is possible to keep the switching device in the closed position, and to keep the pump running once it has been started. At a certain moment during the pumping action, the level of the liquid in the tank reaches the predetermined minimum level. The level of the liquid will not get any lower, as at that moment, the coupling of the floating member to the switching device is lost, as a result of which the switching device returns to the opened position and interrupts the pumping circuit, so that the pump stops running.

Every time the device according to the present invention is operated, liquid is pumped from the tank until the level of the liquid reaches a predetermined minimum level, namely the level at which the coupling of the floating member to the switching device is lost. The quantity of the liquid that is pumped out of the tank equals the total quantity of the liquid that has been present in the tank minus the quantity of the liquid that is associated with the predetermined minimum level of the liquid. Therefore, the quantity of the liquid that is pumped out of the tank is related to an initial level of the liquid in the tank, which may be determined by a user of the device. In a practical embodiment, the tank is provided with a level indication, showing the minimum level of the liquid and other predetermined levels of the liquid, which are directly related to a variety of quantities of liquid which may be dispensed by the device.

As the quantity of the liquid that is pumped out of the tank is controlled mechanically, for example by applying the floating device and the coupling member as described in the foregoing, there is no need for applying expensive controlling components in the device according to the present invention. All that a user of the device needs to do for ensuring that a suitable quantity of liquid is pumped out of the tank is filling the tank to the right level. When a pumping action is started, liquid is pumped out of the tank, and the level of the liquid in the tank gets lower and lower until the level of the liquid reaches the predetermined minimum level. At that moment, the pumping action is automatically terminated. Hence, every time the device is operated, the level of the liquid in the tank is reduced until the same predetermined minimum.

In a practical embodiment of the device comprising the combination of the floating member and the coupling member, the device further comprises a stop which is arranged at a fixed position with respect to the tank, and which serves for contacting the coupling member and constituting a base for the coupling member to tilt about when the level at which the floating member is positioned is too low for the coupling arm to establish a coupling of the floating member to the switching device. For example, the coupling member may comprise an arm extending more or less in a horizontal direction when the floating member is at least partially inserted in the liquid in the tank. In that case, the stop may be constituted by an upper rim of the tank, wherein the combination of the coupling member and the floating member starts to tilt as soon as the arm of the coupling member contacts the upper rim of the tank, which is the case when the level of the liquid in the tank reaches the predetermined minimum level. At that moment, the coupling of the floating member to the switching device which is arranged in the pumping circuit is lost, and the switching device switches back to an opened position, thereby interrupting the pumping circuit.

In a preferred embodiment, the device according to the present invention further comprises an actuator which is adapted to act on the switching device, and which is movably arranged between an active position for keeping the switching device in a closed position and a passive position for allowing the switching device to be in the opened position; and biasing means for biasing the actuator to the passive position; wherein a portion of the coupling member is adapted to engage the actuator. Due to the presence of an actuator which is biased to a passive position, a situation in which the pump starts running immediately after the tank has been filled and put in place in the device is avoided. Instead, the actuator needs to be moved to an active position first. This additional step provides a user of the device with an opportunity to check whether a container for receiving the liquid from the device is put in place. Furthermore, in case the device comprises a boiler having heating means for heating the liquid, the user may check if a heating process has finished.

In the embodiment of the device comprising the floating member and the coupling member, when the actuator is moved to the active position, and the level of the liquid in the tank is above the predetermined minimum level, the coupling member couples the floating member to the switching device through the actuator. In that situation, the weight of the floating member acts against the biasing means, and the actuator is held in the active position for keeping the switching device in a closed position. For the purpose of establishing an engagement between the coupling member and the actuator in a simple and cheap manner, the actuator may comprise a recess for receiving a portion of the coupling member.

The biasing means may comprise any suitable means. In an advantageous embodiment, the biasing means comprise a coil spring which is wound around a portion of the actuator, and which is extending between a thickened portion of the actuator and a fixedly arranged member of the device through which the actuator is extending. In this way, a reliable construction is obtained, wherein the biasing means do not need much space, which is very advantageous in the context of domestic appliances such as beverage makers, for example.

Preferably, the actuator is manually operable to move from the passive position to the active position, against the action of the biasing means. For example, a manually operable knob may be arranged at an end of the actuator. In this way, it is very easy for a user to handle the actuator and to put the actuator to the active position in case it is desired to start a pumping action. In fact, the user only needs to depress the knob and release the knob again. In the embodiment of the device comprising the floating member and the coupling member, in case the level of the liquid in the tank is above the predetermined minimum level, the floating member is coupled to the actuator, and the knob remains in the depressed position until the predetermined minimum level has been reached as a result of the pumping action that is started. In case the level of the liquid in the tank is lower than the predetermined minimum level, the pumping action will stop as soon as the user releases the knob, as the coupling member is not capable of engaging the actuator, and the actuator will immediately resume the passive position under the influence of the biasing means.

When the actuator is manually operable to move from the passive position to the active position, it is easy for a user of the device according to the present invention to let the pump run even when the level of the liquid in the tank is below the predetermined minimum. The user may simply keep the switching device in a closed position by keeping the actuator in the active position. In other words, the user is enabled to bypass the automatic control of the operation of the pump under the influence of the biasing means and the means for keeping the switching device in the closed position when a level of the liquid in the tank is above a predetermined level, wherein there is no need for an additional power switch or the like. This additional possibility which results from applying the actuator may be useful for the purpose of performing a calc cleaning process on the device, for example, during which quantities of vinegar and water are conducted through the device.

The device according to the present invention may be suitable to be used for the purpose of providing hot liquids. In such case, the device may comprise a boiler having an interior space for containing the liquid and heating means for supplying heat to the liquid. In order to avoid a situation in which the pump is started before the liquid is heated to the right temperature, the pumping circuit may comprise a combination of an additional switching device and a sensing member for sensing the temperature of the liquid that is present inside the boiler, wherein the switching device is operated to interrupt the pumping circuit when the temperature of the liquid is below a set point of the switching device.

In case the device comprises a boiler having heating means as described in the preceding paragraph, the device further comprises a heating circuit for energizing the heating means of the boiler, which heating circuit is part of the energizing circuit of the device. Therefore, it is possible to have a switching device for closing either the heating circuit or the pumping circuit. This switching device may be a single-pole double-throws thermostat, for example, which will not allow for a closing of the pumping circuit before the heating process has ended and the liquid is at the right temperature. Thus, when such thermostat is applied, there is no need for using an additional switching device in the pumping circuit for the purpose of avoiding a premature start of a pumping action.

Preferably, in the device comprising a boiler and heating means for heating liquid that is present inside the boiler, a heating process is automatically terminated when a suitable temperature has been reached. This may be realized by using a switching device which is arranged in the heating circuit, which is capable of either interrupting or closing the heating circuit, which is used in combination with a sensing member for sensing a temperature of liquid that is present inside the boiler, and which is adapted to interrupt the heating circuit in case the temperature of the liquid is above a set point of the switching device.

The above-described and other aspects of the present invention will be apparent from and elucidated with reference to the embodiments of a device according to the present invention as described hereinafter.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
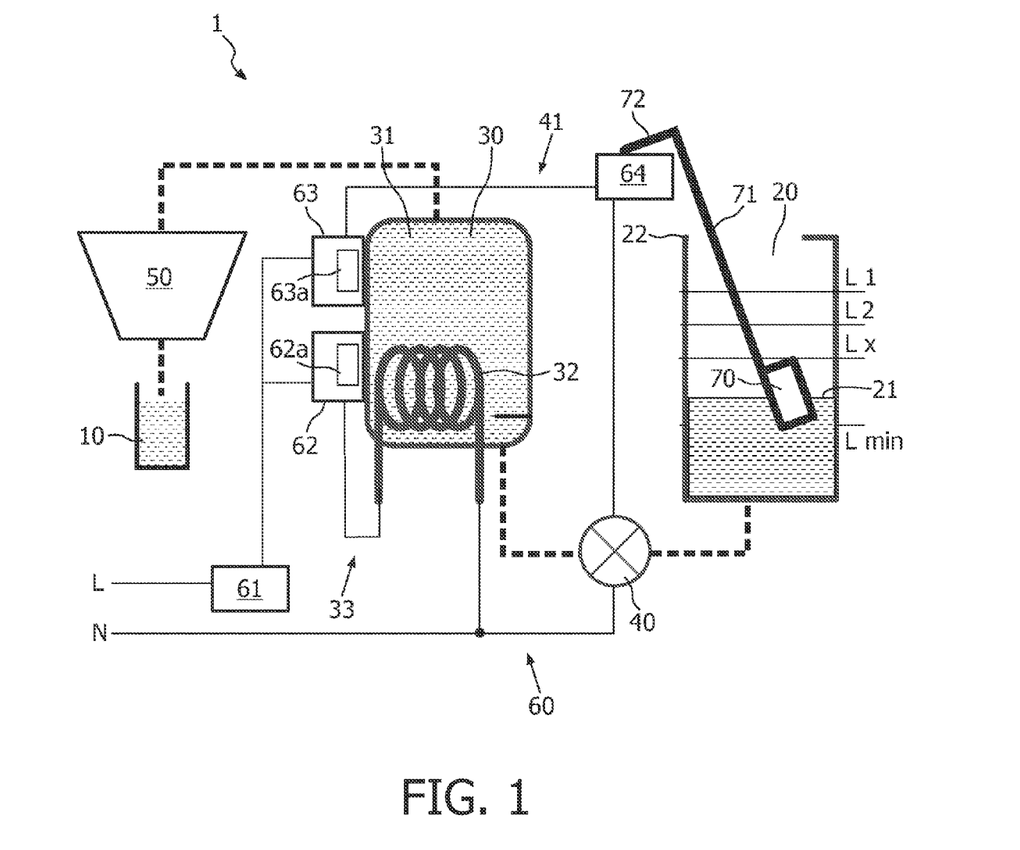
FIG. 1 diagrammatically shows components and an electronics circuit of a beverage maker according to a first preferred embodiment of the present invention.

FIG. 1 diagrammatically shows components 20, 30, 40, 50 and an electronics circuit 60 of a beverage maker 1 according to a first preferred embodiment of the present invention, which will hereinafter be referred to as first beverage maker 1. This beverage maker 1 is suitable for making coffee on the basis of hot water and a quantity of ground coffee beans, which does not alter the fact that the beverage maker 1 may just as well be suitable for preparing other hot drinks. Besides the components 20, 30, 40, 50 and the electronics circuit 60 of the first beverage maker 1, FIG. 1 also shows a container 10 such as a cup for receiving the coffee from the beverage maker 1.

The first beverage maker 1 comprises a water tank 20 for containing water, a boiler 30 having an interior space 31 for containing water and a heating element 32 for supplying heat to the water, an electric pump 40 for pumping water from the water tank 20 to the boiler 30, and a sealable brew chamber 50 for receiving and accommodating ground coffee beans.

When a user desires to make a quantity of coffee by using the first beverage maker 1, the user puts a quantity of ground coffee beans into the brew chamber 50, and activates the beverage maker 1. As a first step in a process of making coffee, the water inside the boiler 30 is heated by means of the heating element 32. When the temperature of the water has reached a predetermined level, the pump 40 is activated automatically, so that cold water is transported from the water tank 20 to the boiler 30, and hot water is transported from the boiler 30 to the brew chamber 50. In the process, as a second step in a process of making coffee, inside the brew chamber 50, an interaction between the hot water and the quantity of ground coffee beans takes place. As a result, hot coffee is obtained, which flows from the brew chamber 50 to the cup 10. The quantity of the water that is used in the process of making coffee is adapted to the quantity of ground coffee beans that is used. In FIG. 1, a path of the water through the first beverage maker 1 is diagrammatically depicted as a dotted line. When a predetermined quantity of water has been conducted through the beverage maker 1, the pump 40 is stopped automatically.

The electronics circuit 60 of the first beverage maker 1 comprises several components, which will be identified in the following description of the way in which the above-described operation of the beverage maker 1 is controlled.

The electronics circuit 60 comprises a main switch 61 for connecting the electronics circuit 60 to a main power line, which is indicated by a letter L in FIG. 1.

Furthermore, the electronics circuit 60 comprises a normally closed thermostat 62, which comprises a sensing member 62a for sensing a temperature of the water inside the boiler 30. The thermostat 62 is adapted to open or close a heating circuit 33 which is part of the electronics circuit 60, and which serves for supplying electric power to the heating element 32 of the boiler 30. When the user of the beverage maker 1 has closed the main switch 61, the water inside the boiler 30 is heated until the temperature of the water has reached a level which corresponds to a set point of the thermostat 62. At that moment, the thermostat 62 switches automatically to an opened position, wherein the heating circuit 33 is interrupted, and the power supply to the heating element 32 stops.

Besides the main switch 61 and the normally closed thermostat 62 as described in the foregoing, the electronics circuit 60 of the first beverage maker 1 comprises a normally opened thermostat 63, i.e. a thermostat 63 that switches to a closed position when a temperature that is detected by a sensing member 63a of the thermostat 63 exceeds a set point of the thermostat 63. The normally opened thermostat 63 is arranged in a pumping circuit 41 which is part of the electronics circuit 60, and which serves for supplying electric power to the pump 40. When the temperature of the water inside the boiler 30 has reached a set point of the normally opened thermostat 63, the thermostat 63 switches to a closed position.

Besides the normally opened thermostat 63, another switching device is arranged in the pumping circuit 41, namely a power switch 64, which is biased to an opened position. The position of the power switch 64 is controlled by means of a combination of a float 70 and a coupling arm 71 attached to the float 70. The float 70 is arranged in the water tank 20, and is intended to be at least partially inserted in the water. The water tank 20, the power switch 64, the float 70 and the coupling arm 71 are shown in greater detail in FIGS. 2 and 3.

Figure 2:
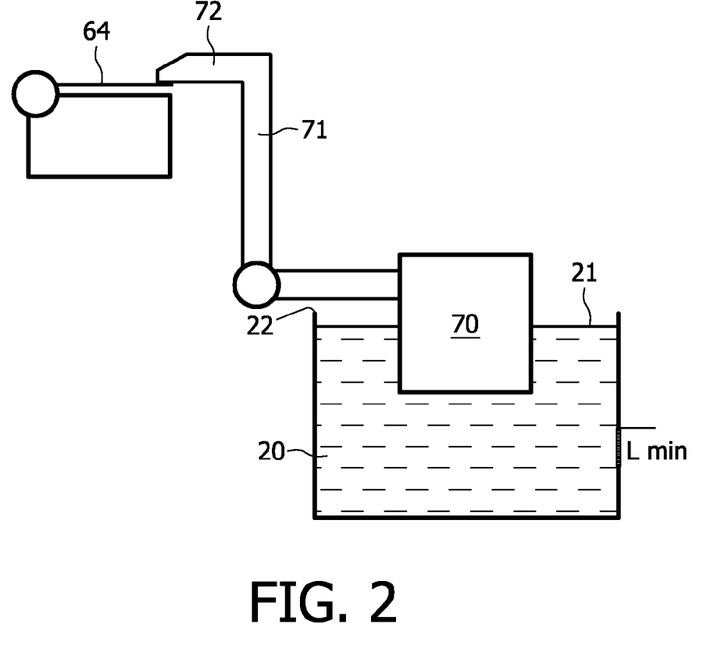
FIG. 2 diagrammatically shows a number of components of the beverage maker shown in FIG. 1, wherein a switching device which is arranged in the electronics circuit of the beverage maker is in a closed position.

As the float 70 is inserted in the water that is present in the water tank 20, a level at which the float 70 is located is depending on a level 21 of the water. When the water level 21 is above a minimum level, which is indicated as L min in FIG. 1, the coupling arm 71 extends all the way to the power switch 64, wherein an end 72 of the coupling arm 71 contacts the power switch 64. Under the influence of the weight of the float 70, in this position of the coupling arm 71, the power switch 64 is put to a closed position. FIG. 2 diagrammatically shows the closed position of the power switch 64, and illustrates how the float 70 is coupled to the power switch 64 through the coupling arm 71.

Figure 3:
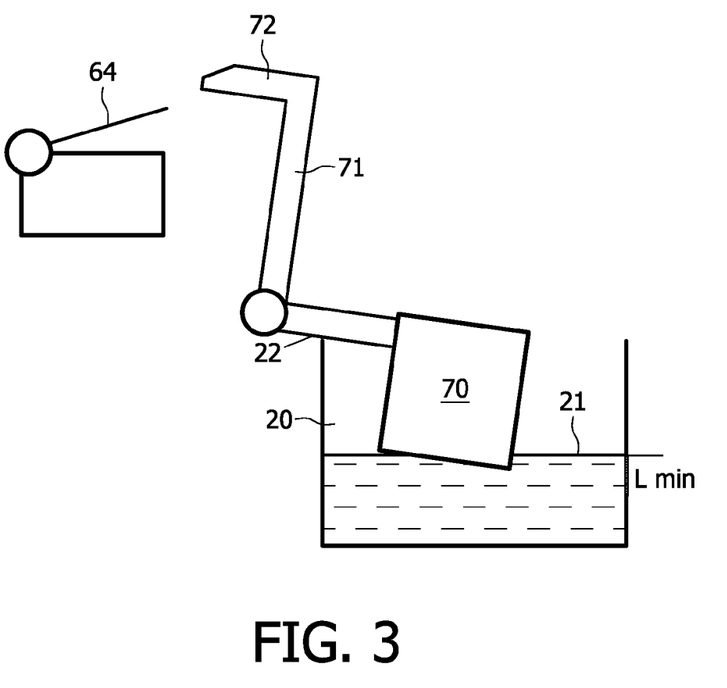
FIG. 3 shows the same components of the beverage maker as shown in FIG. 2, wherein the switching device is in an opened position.

When the water level 21 is at the minimum level, the coupling arm 71 contacts an upper rim 22 of the water tank 20, wherein the coupling arm 71 tilts about the place of contact under the influence of the weight of the float 70. In this situation, the end 72 of the coupling arm 71 is no longer capable of contacting the power switch 64, and the power switch 64 switches to the opened position. FIG. 3 diagrammatically shows the opened position of the power switch 64, and illustrates how the coupling arm 71 is tilted about a place of contact at the upper rim 22 of the water tank 20.

The shown example of the float 70 and the coupling arm 71 is just one of the many possibilities existing within the scope of the present invention for establishing a connection between the position of the power switch 64 and the level at which the float 70 is located in the water tank 20.

When the first beverage maker 1 is operated, two different situations may occur after the process of heating the water in the boiler 30 has ended and the normally opened thermostat 63 has switched to the closed position.

In the first place, it is possible that the water level 21 in the water tank 20 is above the minimum level. In that situation, the float 70 is coupled to the power switch 64 through the coupling arm 71, and the power switch 64 is closed. Consequently, the pumping circuit 41 is closed, and the pump 40 is activated. Under the influence of the pumping action, water is displaced through the first beverage maker 1, wherein cold water is transported from the water tank 20 to the boiler 30, and wherein hot water is transported from the boiler 30 to the brew chamber 50. The pumping action lasts until the water level 21 in the water tank 20 reaches the minimum level, as at that moment, the coupling of the float 70 to the power switch 64 is lost, and the power switch 64 switches back to the opened position, so that the pumping circuit 41 is interrupted.

In the second place, it is possible that the water level 21 in the water tank 20 is lower than the minimum level. In that situation, the power switch 64 is in the opened position, and the pump 40 cannot be operated. The pumping circuit 41 is closed only after the water tank 20 is filled with a sufficient quantity of water, wherein the water level 21 is above the minimum level, so that the coupling arm 71 is capable of establishing a coupling of the float 70 to the power switch 64.

When the first beverage maker 1 is applied, the moment at which a pumping action is terminated is the moment at which the water level 21 in the water tank 22 reaches the minimum level, wherein a coupling of the float 70 to the power switch 64 is lost. On the basis of this fact, a user of the beverage maker 1 knows in advance the quantity of the water that will be pumped out of the water tank 20 during a pumping action, as this quantity of the water equals the quantity above the minimum level. As is diagrammatically shown in FIG. 1, the water tank 20 is provided with a level indication, showing a number of levels L 1, L 2, . . . , L x. For the purpose of a particular process of making coffee, depending on the quantity of ground coffee beans, the user fills the water tank 20 until the water level 21 is at the appropriate level. During operation of the beverage maker 1, the water is pumped out of the water tank 20 until the water level 21 has dropped to the minimum level. At that moment, the pumping action is automatically terminated. In this way, the quantity of water that is used in the process of making coffee is accurately controlled, without the need of a sophisticated control system.

Figure 4:
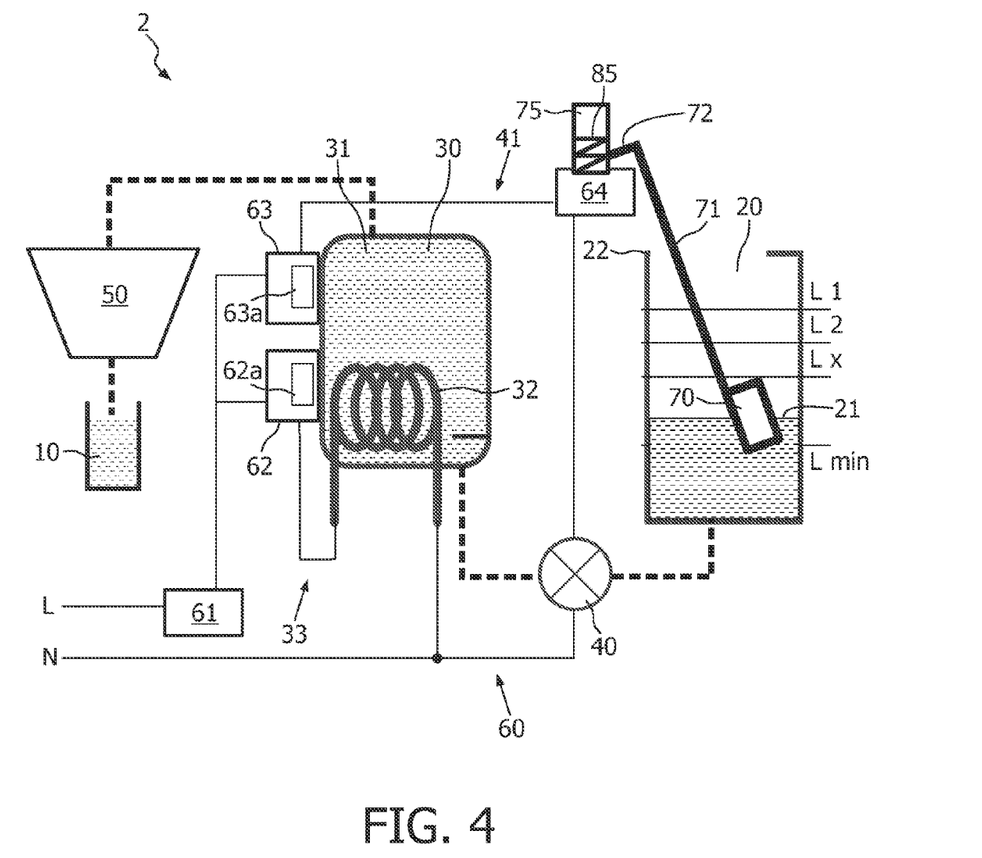
FIG. 4 diagrammatically shows components and an electronics circuit of a beverage maker according to a second preferred embodiment of the present invention.

FIG. 4 diagrammatically shows components 20, 30, 40, 50 and an electronics circuit 60 of a beverage maker 2 according to a second preferred embodiment of the present invention, which will hereinafter be referred to as second beverage maker 2.

The second beverage maker 2 resembles the first beverage maker 1 to a large extent, and comprises a water tank 20, a boiler 30, a pump 40 and a brew chamber 50. Furthermore, the electronics circuit 60 of the second beverage maker 2 is the same is the electronics circuit 60 of the first beverage maker 1. A difference between the two beverage makers 1, 2 is that the second beverage maker 2 comprises an additional component 75 for controlling the position of the power switch 64. This component 75 and its functioning will now be described in greater detail with reference to FIGS. 5 and 6.

Figure 5:
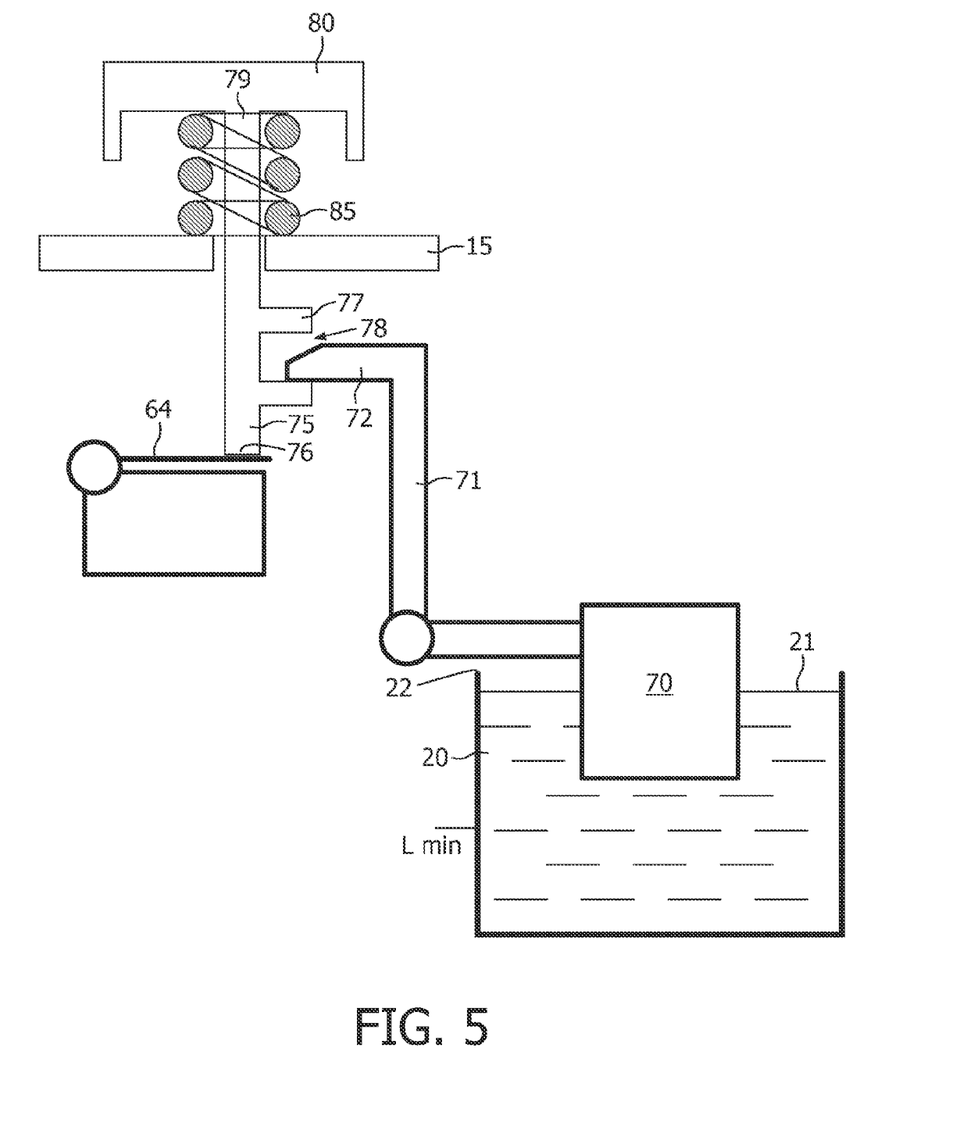
FIG. 5 diagrammatically shows a number of components of the beverage maker shown in FIG. 4, wherein a switching device which is arranged in the electronics circuit of the beverage maker is in a closed position.
Figure 6:
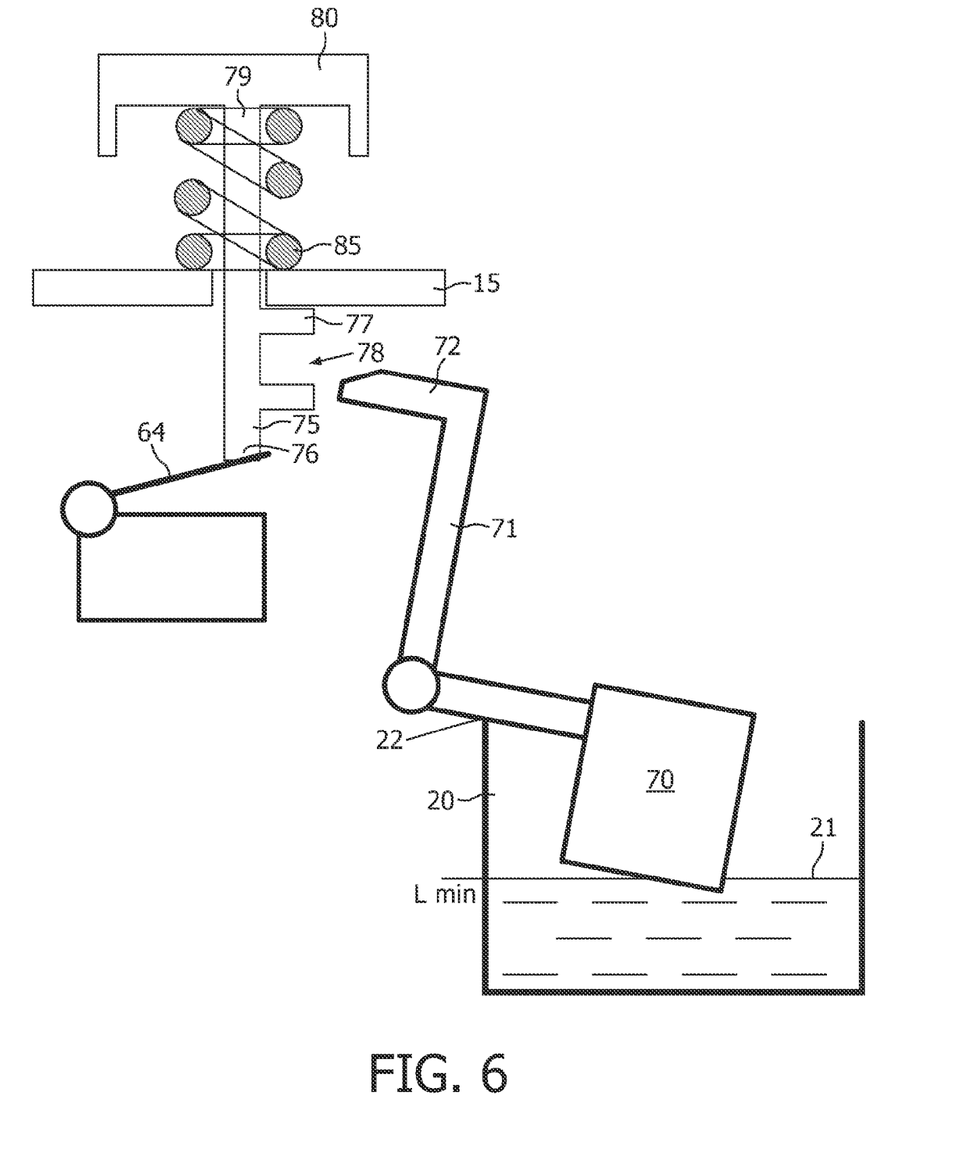
FIG. 6 shows the same components of the beverage maker as shown in FIG. 5, wherein the switching device is in an opened position.

In particular, the additional component 75 is a bar-shaped actuator 75 having an end 76 for contacting the power switch 64. The actuator 75 is movably arranged in the beverage maker 2, while extending through a fixedly arranged housing member 15 of the beverage maker 2. At a position near the end 76 for contacting the power switch 64, the actuator 75 comprises a receiving member 77 having a recess 78, which serves for receiving the end 72 of the coupling arm 71. At another end 79, a knob 80 is arranged on the actuator 75.

Furthermore, a coil spring 85 is wound around a portion of the actuator 75 extending between the housing member 15 and the knob 80.

The actuator 75 is movable between two extreme positions, namely between a passive position, in which the receiving member 77 of the actuator 75 rests against the housing member 15, and in which the actuator 75 allows the power switch 64 to be in the opened position, and an active position, in which the power switch 64 is closed. The actuator 75 is biased to the passive position by means of the coil spring 85. It is to be understood that any other suitable biasing means may be applied within the scope of the present invention.

When the actuator 75 is moved from the passive position to the active position, the actuator 75 is moved against the action of the coil spring 85 in the direction of the power switch 64, until the switch 64 is closed. By means of the knob 80, the actuator 75 is manually operable, so that a user of the beverage maker 2 may determine the position of the actuator 75 and the associated position of the power switch 64. When the user depresses the knob 80, the actuator 75 is moved to the active position, and the power switch 64 is put to the closed position. When the user releases the knob 80, the actuator 75 moves back to the passive position under the influence of the coil spring 85, unless the water level 21 in the water tank 22 is above the minimum level and the end 72 of the coupling arm 71 is received by the receiving member 77. In that case, the float 70 is coupled to the actuator 75, and the actuator 75 is held in the active position, wherein the weight of the float 70 acts against the action of the coil spring 85. The active position of the actuator 75 is maintained until the water level 21 in the water tank 20 has reached the minimum level. At that moment, the end 72 of the coupling arm 71 tilts away from the receiving member 77 and the actuator 75 is moved back to the passive position under the influence of the coil spring 85.

For sake of completeness, it is noted that FIG. 5 illustrates a situation in which the actuator 75 is in the active position, and in which the float 70 is coupled to the actuator 75 through the coupling arm 71. FIG. 6 illustrates a situation in which the actuator 75 is in the passive position, in which the combination of the float 70 and the coupling arm 71 is in a tilted position, and the coupling of the float 70 to the actuator 75 is lost. In the situation as illustrated by FIG. 5, the power switch 64 is in the closed position, whereas in the situation as illustrated by FIG. 6, the power switch 64 is in the opened position. In the latter situation, the coupling arm 71 contacts an upper rim 22 of the water tank 20 and is tilted about the place of contact.

When the second beverage maker 2 having the above-described actuator 75 is applied, and a process of heating the water in the boiler 30 has ended, a pumping action is not automatically started, as such action is only started when a user of the beverage maker 2 depresses the knob 80. Consequently, between a heating process and a pumping process, the user has time for doing things like putting the cup 10 for receiving the coffee in place, filling the water tank 20 up to the right level and putting ground coffee beans in the brew chamber 50, in case such preparatory work still needs to be done.

On the basis of the fact that the second beverage maker 2 comprises the manually operable actuator 75, the user has a possibility of letting the pump run even when the water level 21 in the water tank 22 is below the minimum level. In such case, the user should keep the knob 80 in a depressed position. This option of having a bypass is advantageous in view of performing other processes than a process of making coffee, for example, a process of flushing the beverage maker 2 in order to clean and/or decalcify the beverage maker 2.

Figure 7:
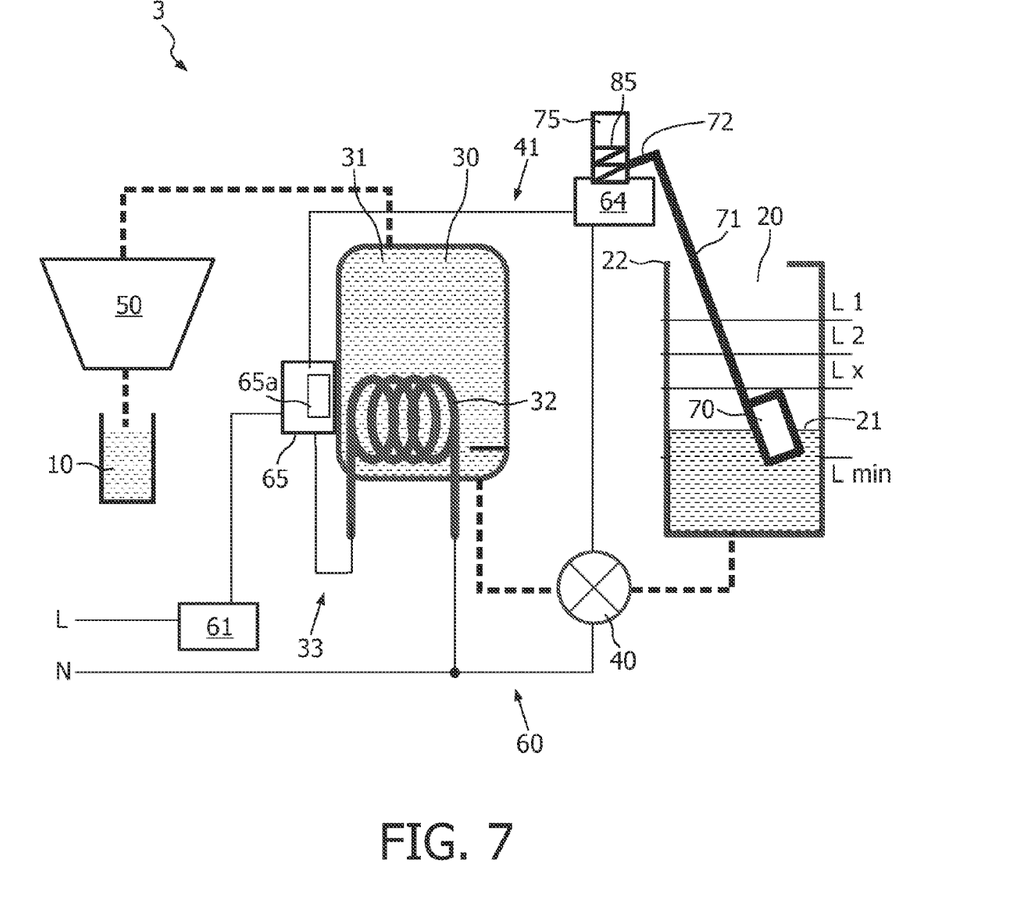
FIG. 7 diagrammatically shows components and an electronics circuit of a beverage maker according to a third preferred embodiment of the present invention.

FIG. 7 diagrammatically shows components 20, 30, 40, 50 and an electronics circuit 60 of a beverage maker 3 according to a third preferred embodiment of the present invention, which will hereinafter be referred to as third beverage maker 3.

The third beverage maker 3 resembles the second beverage maker 2 to a large extent, wherein the only difference between these two beverage makers 2, 3 resides in the fact that the third beverage maker 3 does not comprise the normally opened thermostat 63, and that the normally closed thermostat 62 is replaced by a single-pole double-throws thermostat 65 having a sensing member 65a for sensing a temperature of the water inside the boiler 30. In this way, a protection against starting the pump 40 before the heating process has ended is further improved, as with the single-pole double-throws thermostat 65, the pump 40 can only be started when the heating process has ended.

Figure 8:
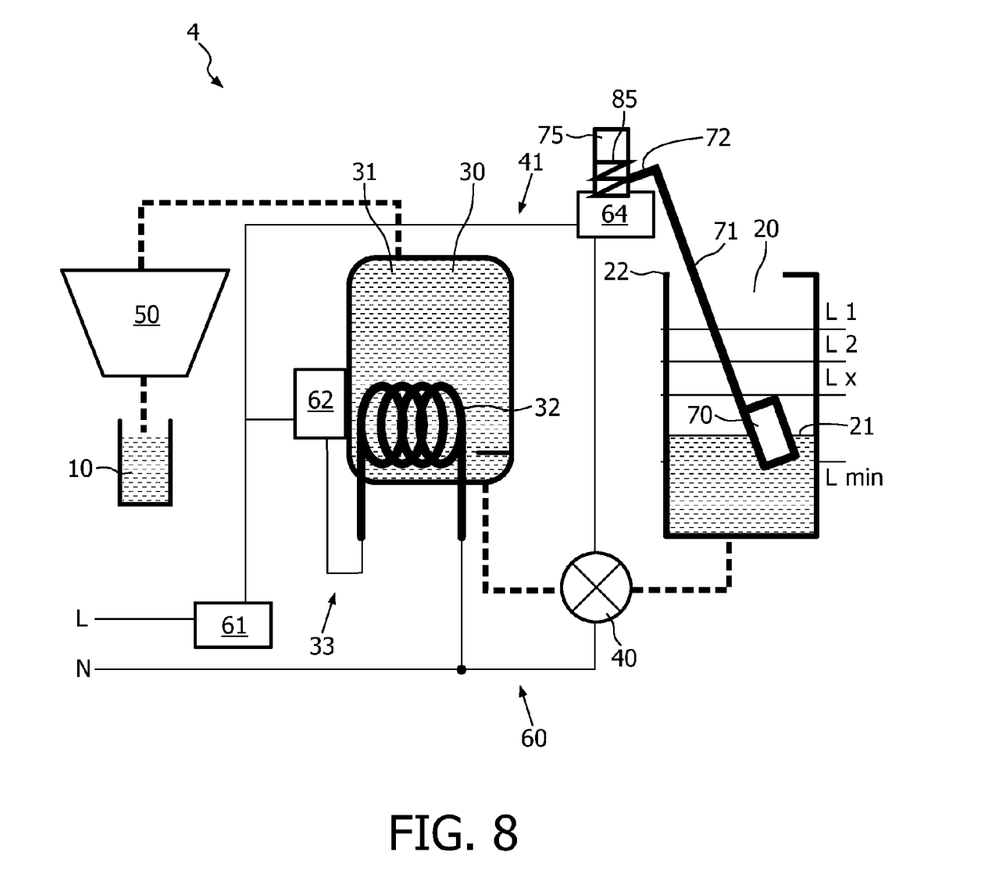
FIG. 8 diagrammatically shows components and an electronics circuit of a beverage maker according to a fourth preferred embodiment of the present invention.

FIG. 8 diagrammatically shows components 20, 30, 40, 50 and an electronics circuit 60 of a beverage maker 4 according to a fourth preferred embodiment of the present invention, which will hereinafter be referred to as fourth beverage maker 4.

The fourth beverage maker 4 resembles the third beverage maker 3 to a large extent, wherein the only difference between these two beverage makers 3, 4 resides in the fact that the fourth beverage maker 4 comprises a normal single-throw thermostat 62 instead of the double-throws thermostat 65. Using the normal single-throw thermostat 62 is the most cost-effective solution if communication in respect of the heating process is clear to a user, and there is no risk of the user erroneously starting the pumping action before the heating process in the boiler 30 has ended. The communication as mentioned may be realized in any suitable manner, for example by means of a light.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Other variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

It should be understood that although the beverage makers 1, 2, 3, 4 as described and shown in the foregoing are described as being suitable for making coffee, the present invention is applicable in any beverage maker which is adapted to make a hot beverage, wherein such beverage does not necessarily need to be coffee. The present invention is also applicable in a device which is adapted to dispense quantities of hot water, i.e. an electric water kettle or the like, wherein the device is only adapted to perform a process of heating the water, and not to perform a process of conducting the water through a quantity of extractable material in order to prepare a beverage. In general, the device according to the present invention may be a device which is adapted to dispense quantities of any liquid, wherein the liquid may be hot or cold.

In the shown examples, a combination of a float 70 and a coupling arm 71 is applied for the purpose of determining in a mechanical manner the right moment at which a pumping action needs to be terminated. Within the scope of the present invention, other possibilities are feasible. For example, a spring-loaded water tank 20 may be applied, wherein the power switch 64 which is arranged in the pumping circuit 41 is allowed to switch to the opened position as soon as the weight of the water tank 20, which is directly related to the quantity of water that is present in the water tank 20, has reached a predetermined minimum, and the water tank 20 is displaced under the influence of a spring.

In the foregoing, a beverage maker 1, 2, 3, 4 comprising a water tank 20 for containing and supplying water during a process of making a beverage, and a pump 40 for pumping the water out of the water tank 20 has been disclosed. In order to terminate a pumping action at a predetermined point, the beverage maker 1, 2, 3, 4 comprises a power switch 64 which is arranged in a pumping circuit 41 for energizing the pump 40, and a combination of a float 70 which is located in the water tank 20 and a coupling arm 71 attached to the float 70. Once the pump 40 has been started, the pumping action is maintained as long as a water level 21 in the water tank 20 is above a predetermined minimum level, wherein the coupling arm 71 is capable of coupling the float 70 directly or indirectly, through an actuator 75, to the power switch 64, as a result of which the switch 64 is held in a closed position. However, as soon as the water level 21 in the water tank 20 reaches the minimum level, the coupling of the float 70 to the power switch 64 is lost, and the switch 64 switches back to an opened position. At that particular point, the pumping circuit 41 is interrupted, and the pumping action is terminated.

The invention claimed is:

1. Device for dispensing a quantity of a liquid, comprising:
a tank for containing the liquid;
a pump for pumping the liquid out of the tank;
an energizing circuit comprising a pumping circuit for energizing the pump;
a switching device which is arranged in the pumping circuit, which is capable of either interrupting or closing the pumping circuit, and which is biased to an opened position for interrupting the pumping circuit;
means which are adapted to act on the switching device in order to keep the switching device in a closed position when a level of the liquid in the tank is above a predetermined minimum level; and
a boiler having an interior space for containing the liquid, and heating means for supplying heat to the liquid,
wherein the pumping circuit comprises a combination of an additional switching device and a sensing member for sensing the temperature of liquid that is present inside the boiler, which combination is adapted to interrupt the pumping circuit when the temperature of the liquid is below a set point of the switching device.

2. Device according to claim 1, comprising a floating member which is located in the tank, and which is intended to be at least partially inserted in the liquid; and a coupling member which is attached to the floating member, and which is capable of coupling the floating member to the switching device when a level of the liquid in the tank is above a predetermined minimum level.

3. Device according to claim 2, further comprising a stop which is arranged at a fixed position with respect to the tank, and which serves for contacting the coupling member and constituting a base for the coupling member to tilt about when the level of the liquid in the tank is lower than the predetermined minimum level.

4. Device according to claim 1, further comprising an actuator which is adapted to act on the switching device, and which is movably arranged between an active position for keeping the switching device in a closed position and a passive position for allowing the switching device to be in the opened position; and biasing means for biasing the actuator to the passive position; wherein a portion of the coupling member is adapted to engage the actuator.

5. Device according to claim 4, wherein the actuator comprises a recess for receiving a portion of the means which are adapted to act on the switching device in order to keep the switching device in a closed position when a level of the liquid in the tank is above a predetermined minimum level.

6. Device according to claim 4, wherein the biasing means comprise a coil spring which is wound around a portion of the actuator, and which is extending between a thickened portion of the actuator and a fixedly arranged member of the device through which the actuator is extending.

7. Device according to claim 4, wherein the actuator is manually operable to move from the passive position to the active position, against the action of the biasing means.

8. Device according to claim 7, wherein a manually operable knob is arranged at an end (79) of the actuator.

9. Device according to claim 1, further comprising a heating circuit for energizing the heating means of the boiler, which heating circuit is part of the energizing circuit of the device; and a switching device for closing either the heating circuit or the pumping circuit.

10. Device according to claim 1, further comprising a heating circuit for energizing the heating means of the boiler, which heating circuit is part of the energizing circuit of the device; a combination of a switching device which is arranged in the heating circuit, and which is capable of either interrupting or closing the heating circuit; and a sensing member for sensing a temperature of liquid that is present inside the boiler, which combination is adapted to interrupt the heating circuit in case the temperature of the liquid is above a set point of the switching device.

* * * * *